Oct. 7, 1952     C. L. MUZZEY     2,612,960
HYDRAULICALLY OPERATED PROPELLER PITCH CONTROL
Filed Dec. 17, 1945     5 Sheets-Sheet 1

INVENTOR
Clifford L. Muzzey
BY
Spencer Hardman Fehr
his ATTORNEYS

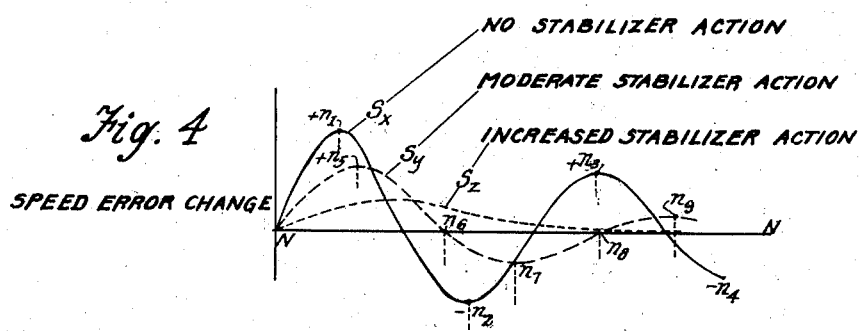
Fig. 4
SPEED ERROR CHANGE
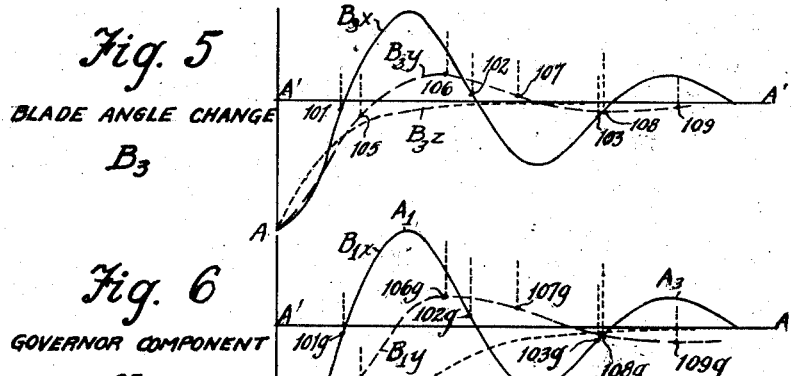
Fig. 5
BLADE ANGLE CHANGE
$B_3$
Fig. 6
GOVERNOR COMPONENT OF BLADE ANGLE CHANGE
$B_1$
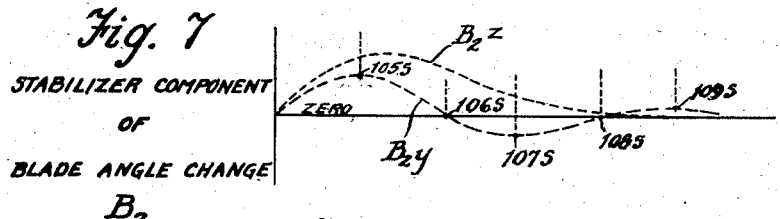
Fig. 7
STABILIZER COMPONENT OF BLADE ANGLE CHANGE
$B_2$
CURVES OF PROPELLER GOVERNING UNIT ACTION SHOWING RESPONSE FROM EQUILIBRIUM TO A SUDDEN THROTTLE INCREASE DEMANDING A BLADE ANGLE INCREASE
INVENTOR
Clifford L. Muzzey
BY
Spencer Hardman and Fehr
his ATTORNEYS

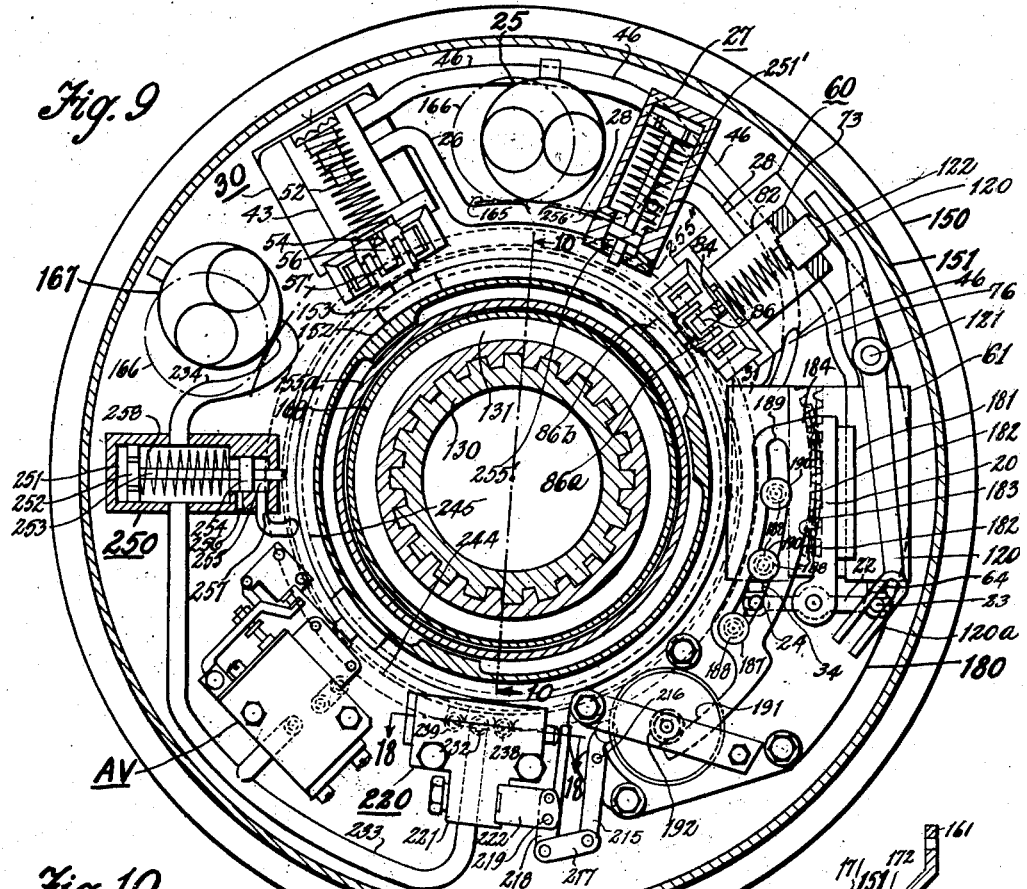
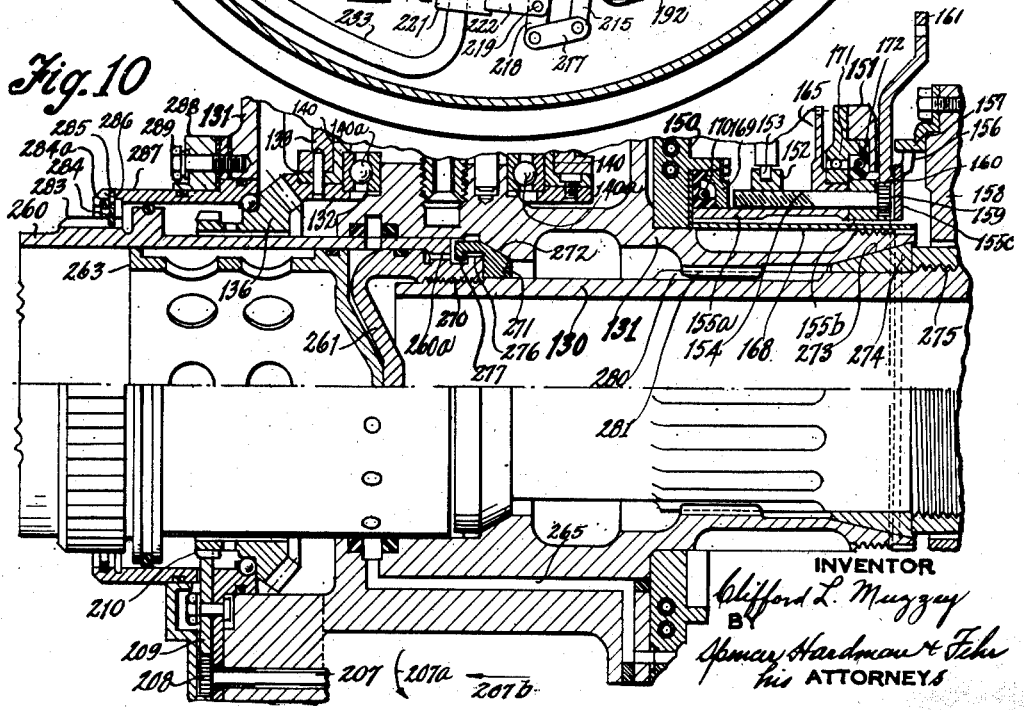

Oct. 7, 1952 C. L. MUZZEY 2,612,960
HYDRAULICALLY OPERATED PROPELLER PITCH CONTROL
Filed Dec. 17, 1945 5 Sheets-Sheet 5
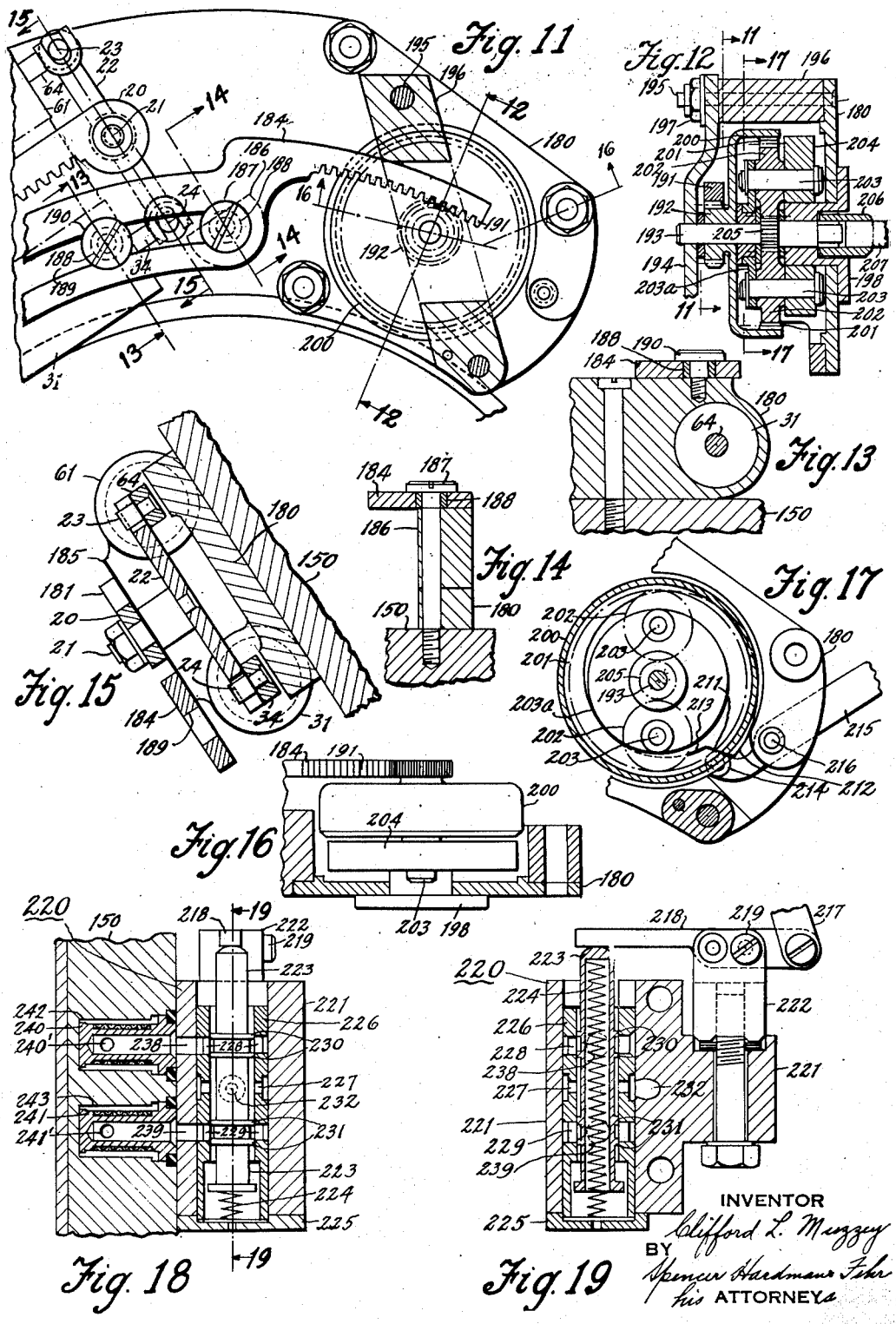
INVENTOR
Clifford L. Muzzey
BY Spencer Hardman Fehr
his ATTORNEYs Patented Oct. 7, 1952

2,612,960

UNITED STATES PATENT OFFICE 2,612,960

HYDRAULICALLY OPERATED PROPELLER PITCH CONTROL

Clifford L. Muzzey, Dayton, Ohio, assignor to General Motors Corporation, Detroit, Mich., a corporation of Delaware Application December 17, 1945, Serial No. 635,459

7 Claims. (Cl. 170—160.21)

This invention relates to the control of airplane propeller pitch or blade angle for the purpose of controlling the speed of the engine.

This application is a continuation in part of Serial No. 574,544, filed January 25, 1945 which has become abandoned.

An object of the invention is so to control the propeller pitch that, when there is a deviation from the engine speed which the speed governor is set to maintain, the return to governed speed will be effected in the minimum time, and with a minimum of speed oscillation caused by over-correction.

In the disclosed embodiment of the invention, the torque motor which adjusts the pitch of the propeller blades is under the control of a speed governor and a stabilizer which operate jointly in a manner such that the rate of pitch change is proportional to the amount of speed error and to the rate of change of speed error.

Further objects and advantages of the present invention will be apparent from the following description, reference being had to the accompanying drawings, wherein preferred embodiments of the present invention are clearly shown.

In the drawings:

Figs. 4, 5, 6 and 7 are curve charts used in explaining the operation of the control apparatus.

Fig. 9 is a sectional view taken principally on the line 9—9 of Fig. 8.

Fig. 10 is a fragmentary sectional view taken principally on the line 10—10 of Fig. 9.

Fig. 11 is a fragmentary view of one of the instruments shown in Fig. 9 and is drawn to a larger scale than Fig. 9, the parts shown in section being taken on the line 11—11 of Fig. 12.

Figs. 12, 13, 14, 15 and 16 are fragmentary sectional views, taken respectively, on the lines 12—12, 13—13, 14—14, 15—15, and 16—16 of Fig. 11.

Fig. 17 is a fragmentary sectional view on the line 17—17 of Fig. 12.

Fig. 18 is a sectional view on the line 18—18 of Fig. 9.

Fig. 19 is a sectional view on the line 19—19 of Fig. 18.

Figure 1:
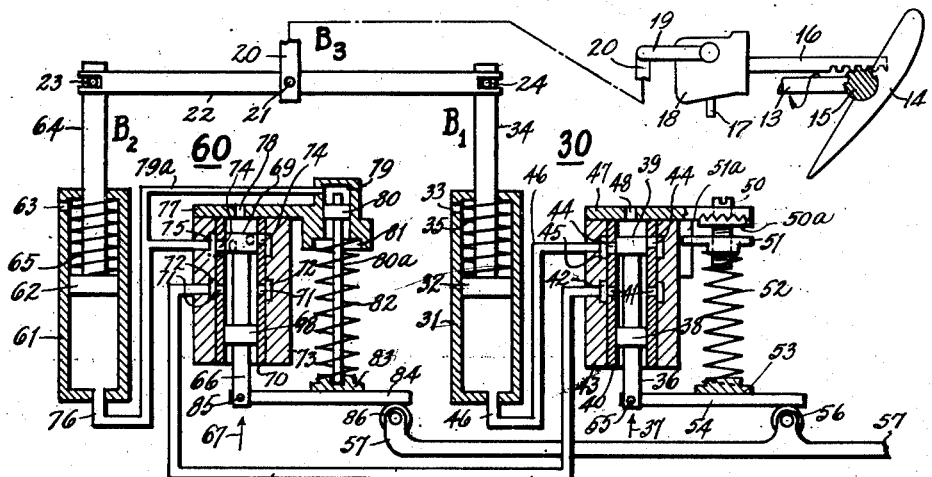
Fig. 1 is a diagram of control apparatus embodying the present invention.

The control apparatus, shown in Fig. 1, provides a blade angle controlling bar 20 which moves in a straight line (vertically in Fig. 1) for the purpose of determining blade angle in a manner to be described later but here shown as oscillating the arm 19 of a differential mechanism 18 supplied with a fluid pressure source or other motivating power 17 to move a rack bar 16 operable upon the root or blade gear 15 of a blade 14 driven by the engine through shaft 13. The bar 20 is connected by a pin 21 with a bar 22 having notched ends receiving, respectively, pins 23 and 24. Pin 24 is connected with a piston rod 34 forming a part of a governor unit 30 and pin 23 is connected with a piston rod 64, forming a part of a stabilizer unit 60. Therefore the bar 20, which determines blade angle, is under joint control by the governor 30 and by the stabilizer 60.

The governor unit 30 comprises a cylinder 31 receiving a piston 32 vented at 33. Piston 32 is connected with the rod 34 which is surrounded by a spring 35. The admission of pressure fluid to the cylinder 31 is controlled by a valve 36 which is controlled by centrifugal force and by a spring 52, and which moves in the direction of arrow 37 when the speed increases. The valve 36 has a guiding land 38 and a port controlling land 39 and is slidable in a valve sleeve 40 having ports 41 connected with an interior annular groove 42 in a valve body 43. Groove 42 is connected by pipe 26 with a fluid pressure pump 25, the pressure from which is limited by a spring loaded valve 27. The land 39 controls ports 44 connected with annular groove 45 connected by pipe 46 with cylinder 31. The valve body 43 supports a plate 47 having a hole 48 for the discharge of fluid from the cylinder 31 when the land 39 is below the ports 44. The plate 47 has a plain hole through which there extends the head of a screw 50 having a serrated collar 50a engaging serrations provided by the plate 47 and surrounding the hole referred to. Screw 50 is engaged by a nut 51 having a notch which receives a rib 51a provided by body 43. Nut 51 receives the upper end of a valve control spring 52, the lower end being received by a retainer 53 mounted on a lever 54 connected by pin 55 with the valve 36 and resting upon an adjustable fulcrum roller 56. Spring 52 is adjusted by turning the screw 50 which is retained in adjusted position by virtue of the engagement of the serrations referred to under the compression of the spring 52. Roller 56 is supported by a control bar 57 which has a horizontal movement as viewed in the drawings.

The bar 57 is moved horizontally by means under the control of the pilot. The mechanism which transmits motion from the pilot's speed controlling member to the bar 57 is of the type shown in the patent to Blanchard and MacNeil, No. 2,307,102 and will be described later. It will be understood that horizontal movement of the bar 57 controls the position of the fulcrum roller 56, thereby controlling the effect of the spring 52 with respect to centrifugal force acting upon the valve 36. The spring 52 is initially adjusted by turning the screw 50, nut 51 being non-rotatable by virtue of a notch therein receiving a rib 51a.

The stabilizer unit 60 comprises a cylinder 61 which receives a piston 62 and which is provided with a vent 63. Piston 62 is attached to the rod 64 which is surrounded by a control spring 65. The admission of pressure fluid to the cylinder 61 is controlled by a valve 66 which, like valve 36 of unit 30, is under the influence of centrifugal force and will move upwardly as indicated by arrow 67 when engine speed increases. Valve 66 has a guiding land 68 and a port controlling land 69 and is slidable within a valve sleeve 70 having ports 71 connected with an annular groove 72 in a valve body 73. The groove 72 is connected by pipe 28 with pump 25. The sleeve 70 has ports 74 connected with an annular groove 75 connected by pipe 76 with cylinder 61. Valve body 73 supports a plate 77 having a hole 78 for the discharge of pressure fluid from the cylinder 61 when the land 69 is below the ports 74.

The plate 77 provides a cylinder 79 for receiving a piston 80 connected with a rod 80a. Pipe 79a connects cylinder 79 with pipe 76. Plate 77 provides a socket 81 for receiving a valve controlling spring 82, the lower end of which is received by a retainer 83 carried by a lever 84 connected by a pin 85 with valve 66 and resting upon a fulcrum roller 86 carried by the bar 57.

The operation of the unit 30 will be considered independent of the operation of the stabilizer unit 60. Let it be assumed that the bar 57 has been located so as to cause the unit 30 to regulate for a certain governed speed N. In the status of equilibrium, the spring 52 balances effect of centrifugal force on the valve 36 in such manner that the ports 44 are closed by the valve land 39. Therefore, the rod 34 does not move. When there is a deviation from governed speed or a speed error represented by $n$, the rod 34 will have a movement represented by $B_1$. If there is an overspeed error $+n$, valve 36 moves up to uncover port 44 and to place pipe 26 in connection with pipe 46 and piston 32 will move up against the action of spring 35 in order to cause rod 20 to move up and the blade angle to increase, thereby effecting a decrease in speed of the engine by reason of the greater torque required to rotate the propeller at the increased blade angle. The speed of the engine therefore decreases and the valve 36 will move toward the axis of rotation of the propeller shaft (down in Fig. 1). If the valve land 39 stops exactly at the port 44 on its downward movement, the upward movement of the rod 34 would cease. Actually, the valve land 39 may move below the port 44 thereby connecting the cylinder 31 with the discharge outlet 48 whereupon spring 35 moves the piston 32 down to effect a reduction of blade angle and therefore a tendency to increase the engine speed and the valve 36 will move up again. Before the unit 30 comes into an equilibrium status, there will be oscillations of the valve 36, each oscillation having an amplitude less than the preceding one until movement of the valve practically ceases.

The unit 30 operates to make the change of blade angle proportional to the time integral of the speed error. This principle of operation can be represented by the equation $B_1 = k_1 \int n \, dt$, in which $B_1$, the movement of the rod 34, represents change in blade angle, $k_1$ is a constant and $n$ is the speed error. By differentiating this equation, the following equation is obtained:

$$\frac{dB_1}{dt} = k_1 n$$

which means that the rate of pitch change is proportional to speed error. This is the usual law of action found in a simple, constant speed propeller governor.

Figure 2:
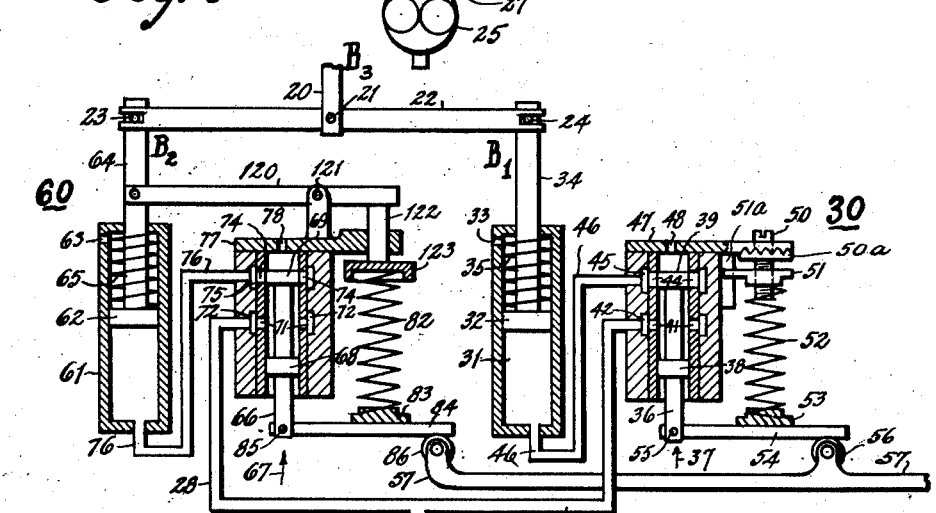
Figs. 2 and 3 are fragmentary sectional views of modifications of the invention shown in Fig. 1.

The operation of the stabilizer unit 60 will now be considered independently of the operation of the governor unit 30. The equilibrium position of the stabilizer is shown in Fig. 1 in which the valve land 69 closes the ports 74. The centrifugal force couple (C. F. × leverage from fulcrum roller 86) equals spring force couple (force of spring 82 × leverage from roller 86) plus feedback couple (fluid pressure acting on piston 80 × leverage from roller 86). Spring 82 has been conditioned for proper operation by the proper position of roller 86, which like roller 56, is controlled by the bar 57. When the propeller over speeds or the speed error is $+n$, the increase of centrifugal force acting on valve 66 causes it to move up against the action of spring 82 so that the higher centrifugal force will be balanced by the increase of the force of the spring 82. Ports 74 are opened and pressure fluid enters the cylinder 61 to cause the piston 62 to move up against the action of the spring 65 thereby producing a movement of rod 64 represented by $B_2$. As the spring 65 is compressed, the pressure of the fluid in cylinder 61 increases. The movement $B_2$ continues to increase until the added pressure, acting upon the feedback piston 80, effects through the rod 80a and the lever 84, together with the added resistance of the spring 82, the return of the valve 66 to equilibrium position. When the valve land 69 is at a position closing the ports 74, motion of the rod 64 ceases. It is apparent therefore that the stabilizer unit 60 gives a definite increase in blade angle for a given over-speed or error $+n$. Ports 74 are so proportioned that the minimum of time is required for piston 62 to reach its new equilibrium position required by the speed error $n$. There are a plurality of ports 74 on each side of the land 69, as shown in Figs. 1 and 2. Therefore the principle of operation of the stabilizer unit 60 can be represented by the following equation: $B_2 = k_2 n$ where $k_2$ is a constant. Differentiating the above equation gives the following equation:

$$\frac{dB_2}{dt} = k_2 \frac{dn}{dt}$$

which means that the rate of pitch change is proportional to the rate of change of deviation from governed speed or proportional to the acceleration of the engine propeller system.

Since the movement of rod 20, represented by $B_3$ is proportional to $B_1 + B_2$, it is apparent that the rate of pitch change is sensitive to the amount of speed error, $n$, and to the rate of change of the speed error, $n$.

In Figs. 4, 5, 6 and 7, distances horizontally represent time. In Fig. 4, the three curves represent variations from a governed speed represented by line N—N. Curve $Sx$ represents variation of speed error before equilibrium is obtained when the unit 30 is acting alone. Curve $Sy$, drawn by long dash lines, represents variations in speed error when blade angle is under control by the unit 30 and by the stabilizer 60 when adjusted to give a moderate amount of stabilizing action. Curve $Sz$, drawn by short dash lines, represents variation in speed error when blade angle is under control by the unit 30 and by the stabilizer 60 when adjusted to give greater stabilizing action.

In Fig. 5, distances vertically indicate the value $B_3$ which represents blade angle change. Point A represents a certain blade angle required for the governed speed N when the engine was producing a certain power. When the engine power is increased, the line A'—A' represents the blade angle required to maintain speed N. The continuous line curve $B_3x$ represents blade angle change when unit 30 operates without the stabilizer. The long dash curve $B_3y$ represents blade angle change when there is a moderate amount of stabilizer action. The short dash curve $B_3z$ represents blade angle change when unit 60 operates with a greater amount of stabilizer action.

In Fig. 6, full line curve $B_1x$ represents blade angle change due solely to movement $B_1$ of rod 34 which alone produces blade angle change when the unit 30 operates without stabilizer action. The curve $B_1x$ is the same as curve $B_3x$ of Fig. 5. Long dash curve $B_1y$ of Fig. 6 represents blade angle change due to the $B_1$ component when blade angle is under control by the unit 30 and by the stabilizer 60 when the latter is adjusted to give a moderate amount of stabilizer action. Short dash curve $B_1z$ represents the $B_1$ component of blade angle change when blade angle is under the control by the unit 30 and by the stabilizer 60 when the latter is adjusted to give a greater amount of stabilizing action.

In Fig. 7, the long dash curve $B_2y$ represents the blade angle change due to the $B_2$ component when the stabilizer 60 is adjusted to give a moderate amount of stabilization; and the short dash curve $B_2z$ represents the blade angle change due to the $B_2$ component when the stabilizer 60 is adjusted to give a greater amount of stabilizing action.

The amount of stabilizing action which the unit 60 should give depends on flight conditions, such as altitude. If more stabilization is required, which means that $B_2$ should be greater, the spring 65 should have a lower spring rate in order to give less opposition to upward movement of the piston 62; and when less stabilization is required, the spring rate should be greater.

Let it be assumed that the governor 30 operates without the stabilizer and that the engine torque output to the propeller is increased. Up to this time, the propeller has been operating at a blade angle value A (Figs. 5 and 6) in order to maintain the governed speed N (Fig. 4). The increased power delivered to the propeller now requires that the blades operate at an angle A' (Figs. 5 and 6) in order to maintain the same governed speed N. The manner in which the governor 30 acting alone accomplishes the blade angle change from A to A' will now be described.

At the start of the action there is a deficiency in blade angle (A' minus A) which permits the engine to accelerate as shown by the initial rise in curve $Sx$ (Fig. 4). As soon as this speed error exists, the governor 30 produces a rate of blade angle increase in proportion to the instantaneous value of the error. Thus, it will be seen that the slopes of curves $B_3x$ and $B_1x$ in Figures 5 and 6 increase in value as long as curve $Sx$ continues to rise, becoming greatest at 101 when curve $Sx$ hits its peak at $+n_1$. An analysis of conditions at this peak value of $Sx$ is important for it shows why the R. P. M. will eventually settle back to the steady value N, and the blade angle will reach the new steady value of A'. At the peak value $+n_1$ of curve $Sx$ in Fig. 4, the slope of $Sx$ is zero indicating that the engine torque output just balances the aerodynamic torque acting on the propeller. However, the blade angle at 101 on curves $B_3x$ and $B_1x$ has not yet reached the new value A' which is required to produce speed N when the engine torque has been increased because the propeller is now operating at a slightly increased R. P. M., namely, $N+n_1$. Thus, at the instant when the R. P. M. starts its return to governed speed N, the blade angle, point 101, is still less than the new value A' which is sought. Since the ordinate of the speed error curve is still positive, though decreasing in value, the blade angle continues to increase, though at a diminishing rate. When curve $Sx$ returns to N, the governor valve shuts off completely, thereby causing blade angle changes to cease. The slope of curves $B_3x$ and $B_1x$ are now zero; and the peak value is $A_1$. On account of the fact that the blade angle was at 101, which is below the required new equilibrium value A', when the speed error reached its maximum positive value $+n_1$, the blade angle curve at the point $A_1$ of its maximum over-correction is closer to A' than it was at point A. Consequently, the next succeeding speed oscillation will be smaller in magnitude than the preceding one as shown by the decreasing distances of points $-n_2$ and $+n_3$ and $-n_4$ from line N—N. When the speed error is $-n_2$, the blade angle is the value 102 which is slightly greater than A'. When the speed error is $+n_3$, the blade angle is the value 103 which is slightly less than A'. The distances between line A'—A' and points 101, 102 and 103, etc., are progressively decreasing. The distances between line A'—A' and points A, $A_1$, $A_2$, $A_3$, etc., are progressively decreasing. It is therefore apparent that the speed and the blade angle will eventually settle to their respectively equilibrium values N and A' in a manner similar to the action of a damped pendulum.

Under certain conditions, such as operation at great altitude or with increased sensitivity of the governing unit 30, natural aerodynamic damping described heretofore, may become very small; and the return to governed speed may be accomplished only after an undesirable number of oscillations.

The response of the system will now be considered with the stabilizer 60 augmenting the action of the governor 30. Curve $Sy$ (Fig. 4) represents now the departure from desired speed. As before, the governor component of the blade angle change, curve $B_1y$ (Fig. 6) starts to increase, its slope being proportional to the ordinate of $Sy$. However, there is added to this blade angle increase the stabilizer component $B_2y$ (Fig. 7) which starts off with an ordinate proportional to the ordinate of $Sy$ itself. Thus, at the outset of the action, the total blade angle, curve $B_3y$ (Fig. 5), rises at a more rapid rate than did $B_3x$, thereby limiting the maximum overspeed to $+n_5$. Total blade angle, point 105 on curve $B_3y$, is at this instant below the A'—A' line, as described in the preceding case, but governor component blade angle point 105g on curve $B_1y$ (Fig. 6) is even further below line A'—A' because stabilizer blade angle, point 105s of curve B2y (Fig. 7), is now adding to help governor blade angle. Governor blade angle B1y continues to increase until Sy has returned to N and speed error is momentarily zero. At this instant, governor component of blade angle change has gone above A' by a small amount (since it was well below A' when the stabilizer component of blade angle change had reached its peak point 105s of curve B2y); and the stabilizer component of blade angle change B2y has returned to zero or point 106s on curve B2y, concurrently with the return of Sy to line N—N. Therefore when the speed error is zero (point $n_6$ where Sy crosses N—N) total blade angle is 106 which is equal to governor component value 106g, which value is only slightly above value A'. The oscillations quickly die out in the following manner: When speed error is $-n_7$ on curve Sy, total blade angle is at 107, which is slightly above A', the governor component of blade angle change is $+107g$ on curve B1y and the stabilizer component is $-107s$. When the speed error is zero, point $n_8$ on curve Sy, blade angle is 108 slightly below A', the governor component is 108g and the stabilizer component is 108s. When the speed error is $+n_9$, the blade angle is 109, or practically at A', the governor component is 109g at slightly less than A', and the stabilizer component is slightly greater than A'. The distances from line N—N to values $n_5$, $n_7$, $n_9$ are progressively less and decrease in values at a rate exceeding the rate of decrease of values $n_1$, $n_2$, $n_3$, $n_4$. The response of the system with the stabilizer acting is like a pendulum with greatly increasing damping.

Figure 3:
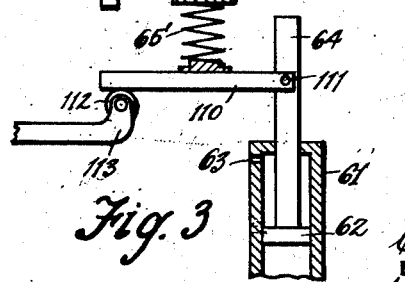

The stabilizer action may be increased until the response of the system becomes aperiodic as illustrated by curves Sz, B3z, B1z and B2z in Figs. 4, 5, 6 and 7 respectively. The increase of stabilizer action may be effected by changing from a spring 65 which gives the effect shown by curve B2y to a spring which gives the effect shown by curve B2z. In order to make possible the change of the effect of the control spring, without disassembling the apparatus, it could be controlled after the manner of controlling the springs 52 and 82. As shown in Fig. 3, the control spring 65' bears against a lever 110 pinned at 111 to the rod 64 and resting on a fulcrum roller 112 pivotally supported by a bar 113 which can be moved by the pilot by a mechanism similar to that used for moving the bar 57. When the roller 112 moves right (horizontally) the leverage of the spring 65' is decreased so that a greater upward (B2) movement of rod 64 may take place before the feed-back piston 80 causes the valve 66 to return to neutral; and more stabilizing effect can be obtained.

The mechanically operated feedback of Fig. 2 may be used in place of the hydraulically operated feedback of Fig. 1. Rod 64 operates a lever 120 pivoted at 121 and bearing against a rod 122 carrying a spring retainer 123 for engaging spring 82. In Fig. 1, rod 64 moves up in accordance with the increase of fluid pressure as controlled by spring 65 and the feedback piston 80 acts in accordance with this pressure increase to force the valve 66 down against centrifugal force. Similarly in Fig. 2, rod 64 moves up in accordance with the increase of fluid pressure as controlled by spring 65 and causes rod 122 to move down a proportionate amount to increase the pressure of spring 82 to force the valve 66 down in opposition to centrifugal force.

Figure 8:
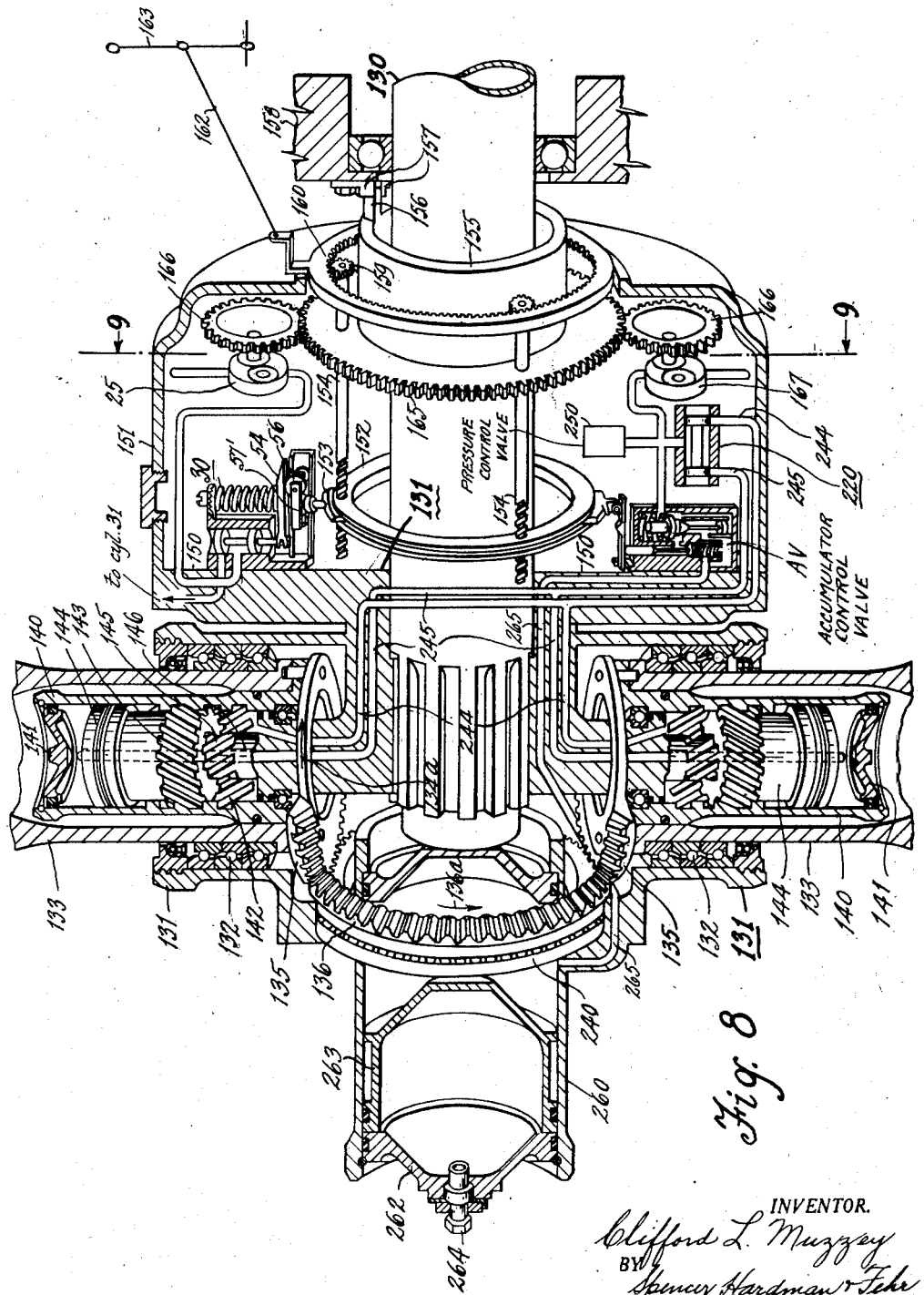
Fig. 8 is a longitudinal sectional view in perspective, showing somewhat diagrammatically, a form of propeller hub and control assembly with which the present invention may be used.

Fig. 8 shows a type of propeller hub and torque unit assembly or servomotor with which the present control apparatus may be used. Fig. 8 shows a engine shaft 130 which supports and drives a propeller hub 131 providing bearings 132 in which the roots of blades 133 are rotatably supported. Each blade is connected with a ring 134 providing a bevel gear segment 135 meshing with a master or equalizing gear 136 journaled in a bearing provided by the hub 131. Each ring 134 is connected with a torque unit or servo cylinder 140 closed at its outer end by a head 141 and at its inner end by means provided by the hub 131. The cylinder 140 has internal helical splines 142 mating with external helical splines 143 of a piston 144 reciprocable in the cylinder 140. Piston 144 is provided with internal helical splines mating with external helical splines 145 of a part 146 provided by the hub 131. The inclinations of the splines are such that when the pistons 144 move toward the shaft 130, the blades 133 are turned in a pitch increasing direction. The hub 131 provides a plate 150, which, together with its cover 151, provide a housing for enclosing pressure fluid and instruments operated thereby, including the governor 30 and the stabilizer 60.

Fig. 9 shows an assembly of the plate 150 and pumps and instruments including the pump 25, the governor 30 and the stabilizer 60 of Fig. 2. As shown in Fig. 9, the lever 120 of Fig. 2 is provided with a forked end 129a which receives the pin 23 which is connected with the rod 64. This provides a construction which is the equivalent of that shown in Fig. 2. Fig. 8 also shows the governor 30. The adjustable fulcrum roller 56 is there shown as mounted upon a carriage 57' instead of upon the bar 57 of Fig. 1. The carriage 57' is moved in a direction parallel to the engine shaft 130 by an axially movable groove control ring 152 whose groove receives a shoe 153 swivelly connected with the carriage 57'. The ring 152 is shifted axially by the rotation of screw-threaded shafts 154 threadedly engaging the ring 152. The shafts 154 are rotatably supported by a sleeve 155 restrained from rotation with the propeller by providing the sleeve 155 with a tang 156 located between brackets 157 fastened to the engine frame 158. Each shaft 154 carries a pinion 159 meshing with a ring gear 160 having a lever 161 connected by a link 162 with a pilot's control lever 163. Sleeve 155 provides a fixed gear 165 meshing with gears 166 for driving pumps 25 and 167.

The sleeve 155, indicated in Fig. 8, represents an assembly of three parts shown in Fig. 10, namely, 155a, 155b and 155c. As shown in Fig. 10, the plate 150, which is secured to the hub 131 by a tubular nut 168, provides a bearing member 169 for the sleeve portion 155a and a seal 170. The cover 151 provides a bearing member 171 for the sleeve portion 155a and a seal 172 located against the bearing member 155b. The member 155c provides a means for retaining the ring gear 160 and provides the tang 156 which is received in the space between the brackets 157 attached to the engine frame 158.

The stabilizer fulcrum roller 86 is controlled in a manner similar to the control of the roller 56 of the governor 50. Lever 84 rests upon the roller 86 as shown in Fig. 9. Roller 86 is carried by a carriage 86a similar to the carriage 57' of the governor 30. To the carriage 86a there is swively connected a shoe 86b which is received by the grooved control ring 152.

As shown in Fig. 9, the cylinder 31 of unit 30 and the cylinder 61 of unit 60 are integral with a frame 180 (see also Fig. 15) attached to the plate 150. Frame 180 also supports the fulcrum 121 of lever 120 and the body 73 of the stabilizer 60. The piston rods 34 and 64 are connected by bar 22 with the bar 20 which, in Fig. 9, is a flat plate guided by a straight boss 181 of frame 180 and having a rack 182 meshing with a circular segment 183 provided by plate 184 which is mounted to slide upon a pad 185 provided by the frame 180 as shown in Fig. 15 and also upon a spacer 186 attached to plate 150 by a screw 187 passing through a roller 188 Fig. 14 located in an arcuate slot 189 provided by the plate 184, the center of curvature of the slot being at the axis of the engine shaft 130. This slot receives other rollers 188 secured by screws 190 threaded into the frame 180 as shown in Fig. 13. The plate 184 provides a rack 191 meshing with a pinion 192 of a differential mechanism shown in further detail in Figs. 11 to 17 inclusive.

Pinion 192 is supported by but not connected with a shaft 193 rotatably supported by a bar 194 supported by frame 180 by screws, such as 195 (Fig. 12), which pass through spacers, such as 196, and which are threadedly engaged by nuts such as 197. The shaft 193 is journaled also in a bushing 198 supported by the frame 180. Pinion 192 is integral with a cup-shaped member 200 providing an internal gear 201 meshing with planet gears 202 each supported by a shaft 203 carried by a plate 204 rotatably supported by the bushing 198. The planet gears 202 mesh with a sun gear 205 attached to the shaft 193 through a coupling 206 by a shaft 207, one end of which is shown in Fig. 10, bottom. Shaft 207 carries a gear 208 meshing with an idle gear 209 driven by a gear 210 provided by the hub of the master gear 136.

The plate 204 provides a cam surface 211 (Fig. 17) between an outer land 212 and an inner land 213. When on speed, the mid-point of cam surface 211 is engaged by a roller 214 carried by a lever 215 pivoted at 216 and connected as shown in Fig. 9, by a link 217 with a lever 218 pivotally supported at 219 by a distributing valve unit 220 whose body 221 carries a bracket 222 supporting the pivot pin or screw 219 (see Fig. 19). Lever 218 engages a valve 223 urged upwardly or against the lever 218 by a spring 224 within the valve 223, and bearing against a plate 225 attached to the body 221. The valve 223 is movable within a valve guide 226 having inlet ports 227 and outlet ports 228 and 229. These outlet ports 228 and 229 are normally blocked by the lands 230 and 231 respectively of the valve 223. The inlet ports are connected with a passage 232 (Fig. 19 and also Fig. 9) which is connected by pipe 233 with a pressure control valve 250 connected by pipe 234 with pump 167 (Fig. 9). As shown in Fig. 18, the outlet ports 228 and 229 are connected, respectively, by passages 238 and 239 with filters 240 and 241, respectively, carried by the plate 150 in pockets 242 and 243, respectively. The pockets 242 and 243 are connected with passages 244 and 245, respectively, which, as shown in Fig. 9, may be of circular formation so as to be readily connectible with the various torque units.

It has been stated with reference to Fig. 1, that upward movement of the piston rods 34 and 64 calls for increase of blade angle. This would be downward movement in Fig. 9 causing clockwise rotation of plate 184 and of pinion 192. Referring to Fig. 17, when pinion 192 and ring gear 201 rotate clockwise, the plate 204, carrying cam 211, rotates clockwise. This would cause counterclockwise movement of lever 215 (Fig. 17) and of lever 218 (Fig. 19) and downward movement of the valve 223 thereby placing the inlet ports 227 in connection with the outlet ports 229 whereby pressure fluid flows through the passages 245 which, as shown in Fig. 8, are connected with the outer ends of the torque unit cylinders 140 thereby causing inward movement of the pistons 144 to effect blade angle increase. As pistons 144 move inwardly, the upper plate 134, Fig. 8, rotates clockwise as indicated by arrow 134a and the master gear 136 rotates counterclockwise as indicated by arrow 136a. During the increase in pitch, the shaft 207 (Fig. 10, bottom) will rotate counterclockwise as indicated by arrow 207a when when viewed in the direction of arrow 207b. Referring to Figs. 12 and 17, when shaft 207 rotates counterclockwise, sun gear 205 rotates in the same direction to cause the axes of the planet gears to move counterclockwise, thereby moving cam plate 204 counterclockwise to restore the cam 211 to its original position of equilibrium as shown in Fig. 17, whereupon the valve 223 returns to neutral position as shown in Fig. 19. It is therefore apparent that when the differential mechanism is operated by the pistons 34 and 64 in a direction calling for blade angle increase, there is effected clockwise movement of the cam 211 from its neutral position shown in Fig. 17, to a position causing the distributing valve 220 to supply fluid to the pitch increasing ends of the torque unit cylinders. The pitch increasing operation effects, through the differential mechanism, a return of the cam 211 to neutral position. Therefore, for every position of the rack bar 20, Fig. 9, there is a definite blade angle whether an increase in blade angle or decrease in blade angle has been demanded. In case of a demand for less blade angle effected by downward movement of the pistons 34 and 64 of Fig. 1 or upward movement in Fig. 9, the cam 211 is caused to move counterclockwise thereby causing clockwise rotation of lever 215 in Fig. 17 and lever 218 in Fig. 19 whereupon the valve 223 moves up to connect the inlet ports 227 with the outlet ports 228 whereby pressure oil is distributed to the passage 244, which, as shown in Fig. 8, is connected with the inner ends of the cylinders 140 so that the pitch decreasing operation will be effected by outward movement of the pistons 144.

The pressure control valve 250, which is of conventional construction, comprises a cylinder 251 receiving a notched dashpot piston 252 connected by a rod 253 with a piston valve 254 slidable in a small cylinder 255 having a bleed port 256 and connected by a pipe 257 with pitch increasing passages 245. A spring 258 surrounding the rod 253 urges the piston valve 254 outwardly, in cooperation with centrifugal force acting thereon. It is therefore apparent that as speed increases, the oil pressure force required to force the piston valve 254 inwardly to open the bleed port 256 will increase. Therefore the pressure in pipe 233 increases with increasing speed. This pressure is increased also whenever the pitch increasing function is demanded since pipe 245, connected with the pitch increasing ends of the torque unit cylinder, is connected by pipe 257 with the cylinder 255 inwardly of the piston valve 254.

Pressure control valve 27, shown diagrammatically in Figs. 1 and 2, is shown in Fig. 9 as being of the same construction as the valve 250 except that the small cylinder 255' is not connected with pressure oil but is vented by passage 255". Cylinder 251' is connected with pipe 28 instead of being directly connected with the pump 25 as shown in Figs. 1 and 2.

On reference to Fig. 9, it will be observed that all of the control mechanism is contained within the regulator enclosed by the plate 150 and the cover 151. It will be observed that there are two pumps or pressure developing means 25 and 167 that are driven by the fixed gear 165 whenever the propeller is rotating. Moving from the top of Fig. 9 in a clockwise direction, it will be apparent generally that the pump 25 delivers high pressure fluid into the passages 26 and 28 which lead to the waste of the governor valve 30, the pressure control valve 27 and the waste of the stabilizer 60. These valve assemblies, that is, the governor valve 30 sensitive to the amount of speed error, and the stabilizer valve assembly 60 sensitive to the rate of change of speed error, both operate upon a change of speed to apply pressure to or permit drain from their respective cylinder elements 31 and 61. Keeping in mind, the description of operation heretofore made for both the governor valve 30 and the stabilizer 60, it should be apparent that upon an increase of speed both of the valve elements 36 and 66 responding to centrifugal force move radially outward of the figure so as to connect the source of pressure in 26 and 28, which by the way, is controlled by the pressure control valve 27, with ports 44 and 74 respectively, which lead to the cylinders 31 and 61 as in Figs. 1 and 2. The piston 32 responds to the amount of speed error to shift one end of the link 22 while the piston 62 responding to the rate of change of speed error to shift the other end of link 22 which piston, by a camming action with the lever 120, operates to increase the tension of spring 82 as has been described. The new position taken by the link 22 as a resultant of the components of movement of pistons 32 and 62 reciprocates the rack bar 184 of the differential mechanism which effectively rotates the plate 204 of the differential mechanism and through the cam face 211 shifts the valve element 223.

It will be further observed on reference to Fig. 9 that the pump 167 also driven upon rotation of the propeller delivers high pressure fluid into the variable pressure control valve 250 which controls the pressure applied through the passage 233 to the waste of the valve element 223 and which, when actuated by the differential mechanism, distributes that high pressure to one side or the other of the torque unit or servomotor 140, the pitch increase line 245 having a branch connection 257 back to the variable pressure control valve for regulating the pressure so applied. Referring back to the point where the differential mechanism operating through its cam face 211 to shift the valve 223, that movement will connect the high pressure line 233 with port 239 which, by passage 245, applies the high pressure to the pitch increase side of the torque unit or servomotor, effecting an increase of pitch of the blade 133. As the blade 133 moves to its new position, it operates through the shaft 207 upon the differential mechanism to restore the cam face 211 and pin 214 in the equilibrium position as soon as the blade movement has effected the proper change in pitch setting to accommodate the increased speed.

If feathering is desired, an accumulator 260 may be provided. As shown in Fig. 8, it has an inner end wall 261, an outer end wall 262 and an intermediate piston 263. The space between the wall 262 and piston 263 is filled with gas under pressure through a check valve 264. The space between the piston 262 and the inner end wall 261 receives fluid under pressure discharged through a pipe 265 which, as shown in Fig. 8, is connected with the pump 167 through an accumulator control valve AV. The construction and mode of operation of the valve AV is fully described in the copending application of David A. Richardson, Serial No. 613,563, filed August 30, 1945.

As shown in Fig. 10, the accumulator cylinder 260 may be used as means for tightening or loosening a nut which secures the hub 131 to the shaft 130. This nut is in fact the end wall 261 of the accumulator and is threadedly connected at 270 with the shaft 130, the wall 261 being splinedly connected with the cylinder 260 at 260a, the turning of the cylinder causing the nut 261 to urge to the right, two half ring wedges 271 having frustro-conical surfaces engaging similar surfaces at 272 provided by the hub 131. This urges the hub 131 toward the right so that a conical surface 273 thereof engages a similar surface provided by a sleeve 274 threadedly connected at 275 with the shaft 130. When the nut 261 is unscrewed, its external flange 276 engages the internal flange 277 provided by the half rings 271, thereby forcing these rings away from the surface 272 of the hub 131. The engaging splines of the hub are indicated at 280 and 281 respectively.

Rotation of the accumulator cylinder 260 is effected by a spanner wrench applied to splines 281, Fig. 10. The cylinder 260 is prevented from turning by a lock washer 284 having internal splines mating with the splines 283 and having tangs 285 which may be received by certain notches 286 provided by a sleeve 287 clamped against the hub 131 by a ring 288 secured by screws 289.

While the embodiments of the present invention as herein disclosed, constitute preferred forms, it is to be understood that other forms might be adopted, all coming within the scope of the claims which follow.

What is claimed is as follows:

1. Apparatus for controlling propeller rotation subject to variable speed by change of blade angle, comprising blades rotatably mounted for change in blade angle, a servo-motor operatively connected to the blades for turning the same, a governor unit rotatable with the propeller and sensitive to speed of propeller rotation, a stabilizer unit rotatable with the propeller and sensitive to speed of propeller rotation, a source of fluid pressure common to said governor unit and said stabilizer unit, said governor unit including a member movable under the urge of fluid pressure from said source, a valve for controlling the application of fluid pressure from said source to said member, and means for moving said valve for applying said fluid pressure to said member, said stabilizer unit including a member movable under the urge of fluid pressure from said source, a valve for controlling the application of fluid pressure from said source to said member, and means for moving said stabilizer valve for applying said fluid pressure to said stabilizer member, an independent source of power for said servo-motor, and means under joint control of both members for controlling the application of the independent source of power to the servo-motor.

2. An apparatus for controlling propeller rotation subject to variable speed by change of blade angle, comprising blades rotatably mounted for change in blade angle, servo-motor operatively connected to the blades for turning the same, a servo-motor control valve, a governor unit rotatable with the propeller and sensitive to speed of propeller rotation, a stabilizer unit rotatable with the propeller and sensitive to speed of propeller rotation, a source of fluid pressure common to said governor unit and said stabilizer unit, said governor unit including a member movable under the urge of fluid pressure from said source, a valve for controlling the application of fluid pressure from said source to said member, and means for moving said valve for applying said fluid pressure to said member for moving the said member at a rate proportional to the amount of speed error, said stabilizer unit including a member movable under the urge of fluid pressure from said source, a valve for controlling the application of fluid pressure from said source to said member, and means for moving said stabilizer valve for applying said fluid pressure to said stabilizer member for moving the said stabilizer member at a rate proportional to the rate of change of speed error, an independent source of fluid pressure for said servo-motor, means for transmitting a resultant of the movement of the two said members to the servo-motor control valve to move it for applying the fluid pressure from said independent source to said servo-motor to obtain a blade angle change, and means operated by the servo-motor for restoring the servo-motor control valve to the neutral position when the required blade angle has been obtained.

3. Apparatus for controlling propeller operation subject to variable speed by change of blade angle, comprising blades rotatably mounted for change in blade angle, a servo-motor operatively connected to the blades for turning the same, a rotatable body supporting the blades, a stationary member about which said body rotates, means operable upon relative rotation between said body and said member to produce a source of fluid pressure for actuating said servo-motor, a governor unit mounted on the rotatable body and having a cylinder and a piston therein and a valve for controlling admission of fluid pressure to the governor cylinder and movable by centrifugal force and a spring opposing movement of the valve whereby the piston moves at a rate proportional to the speed error, a stabilizer unit mounted on the rotatable body and having a cylinder and a piston therein and a valve for controlling admission of fluid pressure to the stabilizer cylinder movable by centrifugal force, and means for opposing movement of the stabilizer valve by centrifugal force and means interconnecting said stabilizer piston and said opposing means for determining the force of the opposing means in proportion to the movement of the stabilizer piston whereby the rate of movement of the stabilizer piston is in proportion to the rate of change of speed error, and means including a distributor valve in the said source of fluid pressure under the joint control of both pistons for controlling the servo-motor.

4. Apparatus for controlling propeller operation subject to variable speed by change of blade angle comprising blades rotatably mounted for change in blade angle, a servo-motor operatively connected to the blades for turning the same, a rotatable body supporting the blades, a stationary member about which said body rotates, means operable upon relative rotation between said body and said member to produce a source of fluid pressure for actuating said servo-motor, a governor unit mounted on the rotatable body and having a cylinder and a piston therein and a valve for controlling admission of pressure fluid to the governor cylinder and movable by centrifugal force and a spring opposing movement of the valve whereby the piston moves at a rate proportional to the speed error, a stabilizer unit mounted on the rotatable body and having a cylinder and a piston therein and a valve for controlling admission of pressure fluid to the stabilizer cylinder and movable by centrifugal force and a spring opposing movement of the stabilizer piston in one direction, whereby pressure in the stabilizer cylinder increases as the piston moves to increase the force of the spring, and means for opposing movement of the stabilizer valve and means interconnecting said stabilizer piston and said opposing means for determining the increase of the force of the opposing means in response to the increase of pressure in the stabilizer cylinder whereby the rate of movement of the stabilizer piston is in proportion to the rate of change of speed error, and means including a distributor valve in the said source of fluid pressure under the joint control of both pistons for controlling the servo-motor.

5. Apparatus for controlling propeller operation subject to variable speed by change of blade angle comprising blades rotatably mounted for change in blade angle, a servo-motor operatively connected to the blades for turning the same, a rotatable body supporting the blades, a stationary member about which said body rotates, means operable upon relative rotation between said body and said member to produce a source of fluid pressure for actuating said servo-motor, a governor unit mounted on the rotatable body and having a cylinder and a piston therein and a valve for controlling admission of pressure fluid to the governor cylinder and movable by centrifugal force and a spring opposing movement of the valve whereby the piston moves at a rate proportional to the speed error, a stabilizer unit mounted on the rotatable body and having a cylinder and a piston therein and a valve for controlling admission of pressure fluid to the stabilizer cylinder and movable by centrifugal force and a spring opposing movement of the stabilizer piston in one direction, whereby pressure on the stabilizer cylinder increases as the piston moves to increase the force of the spring, and means for opposing movement of the stabilizer valve and means interconnecting said stabilizer piston and said opposing means for determining the increase of the force of the opposing means in response to the movement of the stabilizer piston whereby the rate of movement of the stabilizer piston is in proportion to the rate of change of speed error, and means including a distributor valve in the said source of fluid pressure under the joint control of both pistons for controlling the servo-motor.

6. Apparatus for controlling propeller operation subject to variable speed by change of blade angle comprising blades rotatably mounted for change in blade angle, a servo-motor operatively connected to the blades for turning the same, a rotatable body supporting the blades, a stationary member about which said body rotates, means operable upon relative rotation between said body and said member to produce a source of fluid pressure for actuating said servo-motor, a governor unit mounted on the rotatable body and having a cylinder and a piston therein and a valve for controlling admission of pressure fluid to the governor cylinder and movable by centrifugal force and a spring opposing movement of the valve whereby the piston moves at a rate proportional to the speed error, a stabilizer unit mounted on the rotatable body and having a cylinder and a piston therein and a valve for controlling admission of pressure fluid to the stabilizer cylinder and movable by centrifugal force and a spring opposing movement of the stabilizer piston in one direction, whereby pressure in the stabilizer cylinder increases as the piston moves to increase the force of the spring, and resilient means for opposing movement of the stabilizer valve and hydraulic means including a cylinder connected with the first mentioned stabilizer cylinder and a piston for adding to said resilient means a force in proportion to the increase of pressure in the first mentioned stabilizer cylinder whereby the rate of movement of the stabilizer piston is in proportion to the rate of change of speed error, and means including a distributor valve in the said source of fluid pressure under the joint control of both pistons for controlling the servo-motor.

7. Apparatus for controlling propeller operation subject to variable speed by change of blade angle comprising blades rotatably mounted for change in blade angle, a servo-motor operatively connected to the blades for turning the same, a rotatable body supporting the blades, a stationary member about which said body rotates, means operable upon relative rotation between said body and said member to produce a source of fluid pressure for actuating said servo-motor, a governor unit mounted on the rotatable body and having a cylinder and a piston therein and a valve for controlling admission of pressure fluid to the governor cylinder and movable by centrifugal force and a spring opposing movement of the valve whereby the piston moves at a rate proportional to the speed error, a stabilizer unit mounted on the rotatable body and having a cylinder and a piston therein and a valve for controlling admission of pressure fluid to the stabilizer cylinder and movable by centrifugal force and a spring opposing movement of the stabilizer piston in one direction, whereby pressure in the stabilizer cylinder increases as the piston moves to increase the force of the spring, and a spring for opposing movement of the stabilizer valve by centrifugal force and mechanical means actuated by the stabilizer piston for increasing the force of said second mentioned stabilizer spring in proportion to movement of the stabilizer piston whereby the rate of movement of the stabilizer piston is in proportion to the rate of change of speed error, and means including a distributor valve in the said source of fluid pressure under the joint control of both pistons for controlling the servo-motor.

CLIFFORD L. MUZZEY.

REFERENCES CITED

The following references are of record in the file of this patent:

UNITED STATES PATENTS

| Number | Name | Date |
| --- | --- | --- |
| 2,232,219 | Dueringer | Feb. 18, 1941 |
| 2,346,856 | Martin | Apr. 18, 1944 |
| 2,374,708 | Shouets | May 1, 1945 |
| 2,375,429 | Martin | May 8, 1945 |
| 2,399,685 | McCoy | May 7, 1946 |